US006225770B1

(12) United States Patent
Heinrich et al.

(10) Patent No.: US 6,225,770 B1
(45) Date of Patent: May 1, 2001

(54) METHOD FOR THE CONTROL OF MOTOR DRIVEN ADJUSTMENT DEVICES IN MOTOR VEHICLES

(75) Inventors: Peter Heinrich, Hinternah; Mike Eichhorn, Ilmenau, both of (DE)

(73) Assignee: Brose Fahrzeugteile GmbH & Co., KG, Coburg (DE)

( * ) Notice: Subject to any disclaimer, the term of this patent is extended or adjusted under 35 U.S.C. 154(b) by 0 days.

(21) Appl. No.: 09/360,601

(22) Filed: Jul. 26, 1999

(30) Foreign Application Priority Data

Jul. 24, 1998 (DE) ..................... 198 35 091
Apr. 6, 1999 (DE) ..................... 199 16 400

(51) Int. Cl.$^{7}$ ..................... H02P 5/00
(52) U.S. Cl. ..................... 318/463; 318/490; 318/464; 388/902
(58) Field of Search ..................... 318/138, 254, 318/439, 461, 463, 464, 480, 490, 601, 603, 721; 388/809, 902, 909

(56) References Cited

U.S. PATENT DOCUMENTS

| | | | | |
|---|---|---|---|---|
| 4,600,866 | * | 7/1986 | Seto . | |
| 4,862,045 | * | 8/1989 | Gleim et al. | 318/254 |
| 5,122,719 | * | 6/1992 | Bessenyei et al. | 318/629 |
| 5,404,673 | | 4/1995 | Takeda et al. | 49/28 |
| 5,444,345 | * | 8/1995 | Jinnai | 318/603 |
| 5,765,884 | | 6/1998 | Armbruster | 292/216 |

FOREIGN PATENT DOCUMENTS

| | | |
|---|---|---|
| 42 01 971 | 8/1993 | (DE) . |
| 195 33 193 | 3/1997 | (DE) . |
| 197 43 129 | 3/1999 | (DE) . |

* cited by examiner

*Primary Examiner*—Bentsu Ro
(74) *Attorney, Agent, or Firm*—Christie, Parker & Hale, LLP

(57) ABSTRACT

High resolution and accuracy of the measured values for detection of the position, speed and/or acceleration of a drive is ensured. The tolerances are determined and considered in signal evaluation on a partitioned basis. Measurement errors caused by inaccuracies of the signal generator due to manufacturing difficulties are greatly reduced or eliminated such that use of signal generators without particularly high quality specifications is possible. Thus, use of less exact components in generation and detection is possible.

32 Claims, 4 Drawing Sheets

METHOD FOR THE CONTROL OF MOTOR DRIVEN ADJUSTMENT DEVICES IN MOTOR VEHICLES

FIELD OF THE INVENTION

The invention concerns the process for the control of motor driven adjustment devices in motor vehicles. These control devices may, for example, be a window lifter, a sun roof control, or a seat adjustment device.

BACKGROUND OF THE INVENTION

From U.S. Pat. No. 5,404,673, a window lifter with a drive to raise and lower a window pane and with an entrapment protection device is known. The speed of the drive and thus the opening and closing speed of the window pane, as well as the direction of movement and position of the window pane, are detected. Upon entrapment of a body part or object between the top edge of the window pane and the door frame, the load on the drive increases, and the drive speed drops below a predefined value. The drive turns off and possibly reverses, and results in the stopping or opening of the window pane.

Since upon entry of the window pane into the door seal before complete closing of the window pane, the drive speed drops to the point of stopping the drive because of the increased resistance, the pane position must be accurately detected, so that the entrapment protection turns off in the seal zone.

For this, a sensor for sensing a position and direction of rotation is provided. The sensor for sensing the direction of rotation consists of a magnetic disk with a north and south pole as well as two Hall sensors offset an angle of 90° relative to each other around the axis of the magnetic disk connected to the drive shaft, which emit sensor signals offset from each other by one-fourth period, from which the direction rotation and thus the direction of movement of the window pane is determined.

The position sensor consists of an annular multipole magnet connected to the drive shaft with alternatingly magnetized magnetic poles and two Hall sensors, which are disposed at a distance of one-half magnetic pole from each other. The magnetization alternation detected by the Hall sensors during a rotation of the drive, and with it that of the annular multipole magnet, are fed as counting pulses to a counter along with the sensor signal of the direction of rotation sensor, whereby the counting pulses are counted upward or downward depending on the direction rotation of the drive, and thus indicate the respective position of the window pane.

For detection of the speed, direction of movement, and position of the window pane, the known drive control and entrapment protection device requires two magnetic disks as signal generators with four Hall sensors. The signal generator provided to trigger the entrapment protection criterion by reducing the speed of the drive has only low resolution with one pole change per revolution.

For speed control of rotating drives, or with a linear adjustment such as a seat distance adjustment to obtain a constant adjustment speed over the adjustment path, a high-resolution sensor system is necessary to enable short reaction times in the control process. However, partitioned signal generators, such as multipole magnets, are subject to tolerances which may have a negative effect on control behavior.

If, consequently, to increase the resolution in the detection of the speed of electric motor, a multipole magnet is used as a signal generator, the problem arises that with rotation magnets with more than two poles, the distribution of the poles on the magnet is not exactly symmetric, but has an error of approximately 10% per sector. This error rate holds in general for all signal generators for speed detection sensors which cannot be manufactured exact enough and operate with an optoelectric, inductive, capacitive sensor, etc. as the signal receiver.

The tolerances described and manufacturing-related errors from section to section of the signal generator or from sector to sector in a circular disk-shaped signal generator result in misinterpretations in the signal evaluation. For example, due to misinterpretations, a drop in speed is detected although the drive is operated at a constant speed, and possibly, erroneous reactions of the control arrangement of the adjustment device result, for example, an erroneous reversing of a window pane due to defective detection of a speed sensor results, which is interpreted as an entrapment situation by an entrapment protection device.

SUMMARY OF THE INVENTION

The object of the present invention is to provide a process for control and regulation of motor driven adjustment devices in motor vehicles which ensures exact detection of position, speed, or acceleration of the drive with high-resolution of the measured values without imposing particularly high accuracy specifications on the signal generator.

The process according to the invention ensures high-resolution and accuracy of the measured values for detection of the position, speed, and/or acceleration of a drive. Since, with the object of the present invention, the tolerances are determined and considered in signal evaluation on a partitioned basis, measurement errors caused by inaccuracies of the signal generator due to manufacturing difficulties are greatly reduced or eliminated such that use of signal generators without particularly high quality specifications is possible. Thus, use of less exact components in signal generation and detection is possible.

In particular, it is possible to use components whose manufacturing accuracies are limited for systemic reasons, such as manufacturing precision, i.e., the sector size and magnetization strength of electromagnetic signal generators in conjunction with magnet-sensitive structural components, such as detectors in the form of Hall sensors. In signal generators, the tolerances may exist in the partitions. In detectors (in the form of one or a plurality of sensors) the tolerances may exist in the electrical tolerances, for example, the hysteresis of the switching thresholds in Hall sensors.

Consequently, with a low expenditure on device-engineering, it is possible to realize high-resolution position, rotational speed, velocity, or acceleration controls.

The process according to the invention can be implemented both by means of electronic error correction or by switching technology. For electronic error correction only a single sensor is required.

With electronic error correction, the tolerance-associated characteristics of the signal generator partitions are preferably determined in a test movement of the signal generator.

Additional requirements for a process for control of an adjustment device result if, for example, the speed of a seat adjustment device is to be controlled. In this case, in addition to the setting of a constant speed (ideal speed) in the operating point of the motor, a uniform, vibration-free starting and takeoff of the seat is important. The operating point of the motor of the seat adjustment device is defined under consideration of the resonance frequencies of the seat unit consisting of the drive motor, adjustment drive, and mechanical seat components as well as the vehicle body. In addition, data with regard to the speed of the seat to be adjusted as well as an adjustment energy reserve must be taken into account.

No movements or noises which disturb the vehicle occupants should occur during starting and stopping of an electrical seat adjustment device due to the starting or stopping of the seat. Moreover, the most wear-free operation of the seat adjustment device is desirable in terms of savings of materials.

According to another aspect of the invention, there is the object of providing a process for the control of motor driven adjustment devices in motor vehicles, which enables precise detection of position, speed, and possibly acceleration of the drive with high-resolution of the measured values, on the one hand, and which permits quiet, uniform starting and takeoff of the adjustment device, on the other.

Provision is made accordingly, that after activation of the drive motor, first tolerance-associated characteristics values of the signal generator are determined, and correction values which are to be considered in the evaluation of the output signals of the detector (in the form of one or a plurality of sensors) associated with signal generator are specified from the tolerance-associated characteristic values. By means of this process step, high-resolution and accuracy of the measured values for the detection of position, speed, or acceleration of the drive is ensured. In particular, it is thus possible to largely eliminate measurement errors caused by manufacturing-associated or other inaccuracies of the signal generator.

The correction values in the operation of the drive motor are adapted at least as long as a predefined cutoff criterion has not been met. During the determination and adaptation of the correction values, intermediate results of these values are established and used to specify control parameters of the control algorithm. Based on this additional process step, the control of the drive motor can begin promptly after its activation. It is, in particular, not essential to wait until all correction values, which must be taken into account in the evaluation of the output signals of the detector, have been determined to begin control of the drive motor. Instead, the promptly established intermediate results of these correction values are used here. Thus, upon starting the seat, the deviation of the actual speed of the drive motor of the adjustment device from the desired speed is minimized.

The adaptation of the correction values provided according to the invention means that the correction values are changed as long as a specific cutoff criterion, with which the adaptation of the correction values is terminated, has not been reached. For example, the correction values can be determined successively with increasingly greater accuracy until a predefined accuracy of the correction values is achieved. This should specifically also include the case in which the adaptation of the correction values continues during the entire duration of the activation of the adjustment device. This corresponds to the cutoff criterion "maximum accuracy obtainable", i.e., the adaptation of the correction values continues here to further increase the accuracy. Alternatively, it is also possible to define this cutoff criterion as "cutoff of adaptation of the correction values upon termination of the adjustment movement".

Permanent improvement of the accuracy of the correction values is readily possible according to the present teaching claimed since the associated longer duration of determination of the correction values does not interfere with the prompt starting of control of the drive motor. Instead, the preliminary, less accurate correction values are used for control. Thus, the adaptation of correction values can be continued, specifically, even after reaching the operating point of the drive motor.

The determination of the correction values preferably occurs automatically upon each new starting of the motor of the adjustment drive such that changes attributable to wear, environmental influences, or the like can always be considered currently. However, on the other hand, it is also possible to redefine the correction values at specific, predefined intervals and to operate in the meantime with stored correction values.

The control algorithm itself can, for example, consist of a recursively created, time-discrete PID controller with limitation of variables and back calculation. Such a controller requires a set of three control parameters.

In a preferred embodiment of the invention, after reaching the operating point of the drive motor, the control parameters are redefined, i.e., a new set of control parameters is selected. As a rule, after reaching the operating point, "harder" control parameters are selected than upon starting the drive such that after reaching the operating point of the motor, only smaller fluctuations in speed are tolerated than during the starting of the motor.

In an improvement of the aforementioned embodiment of the invention, provision is made that the control parameters are not redefined until both the operating point of the motor has been reached and the adaptation of the correction values has been terminated. In this case, the redefinition of the control parameters after reaching the operating point of the motor means that this definition is final and no additional changes in the control parameters are undertaken as long as the motor operates at the operating point with its ideal speed. Even when, according to another variant of the invention, after reaching the operating point of the motor, the correction values are still adapted without limitation, it is, in principle, advantageous to work with new harder control parameters after reaching the operating point.

After reaching the operating point of the motor, the pulse width modulation relationship is also preferably used for control of the speed.

After starting the motor, its speed is preferably increased with substantially constant acceleration. The change in speed over time forms a straight line; the motor is thus run up along a "ramp" to its operating point. Deviations from the respective ideal speed predefined by the slope of the ramp during start-up of the motor are thus corrected by the above-described control.

As long as the correction values have still not been determined with adequate accuracy, after starting the drive motor, the speed is preferably determined by averaging a plurality of signals each representing the speed of the motor. Here, specifically, floating averaging can be used. By means of this averaging, tolerance-associated fluctuations of the speed data of the signal generator are at least partially eliminated. However, at the same time the real time content of the speed information decreases.

The process can be executed, in particular, with a signal generator which is partitioned. The correction values are used for the compensation of tolerances which can be attributed to this partitioning. One example of such a partitioned signal generator is a multipole magnet which is connected to the drive shaft of the motor of the adjustment device and moves along with it. Tolerances (inaccuracies)

can occur here in the dimension of the individual segments of the multipole magnets, on the one hand, and can also be attributed to different switching thresholds of the north-south and the south-north transitions of the multipole magnets. The latter are particularly discernible upon digitization of the signal produced by the signal generator. With such a signal generator, the correction values thus serve, on the one hand, to compensate manufacturing-associated fluctuations in the dimension of the individual partitions of the signal generator and, on the other, to eliminate inaccuracies which must be attributed to the transitions between the individual partitions of the signal generator.

In the aforementioned exemplary embodiment of the invention, it also becomes clear that by averaging the signals generated one after another by different partitions of the signal generator, the accuracy of the speed data can be increased. Thus, in the case of a multipole magnet, already by averaging one north-south and one south-north transition each, it is possible to at least significantly reduce the inaccuracy attributable to different switching thresholds. As needed, however, the averaging can also be performed over a larger number of values, for example, over four or eight values.

In the case of a signal generator which is connected to the drive shaft of the motor and, consequently, rotates with the driveshaft, provision can be made that for each partition of the signal generator, its own correction value is determined in the form of a correction of the angle of rotation associated with the respective partition such that the corrected angles of rotation represent the actual dimension of the partitions along the periphery of the signal generator.

The present invention is independent of what principle is used for the operation of the signal generator. In particular, the signal generator may operate according to a magnetic, conductive, capacitive, resistive, or even an optical principle.

In particular, a multipole magnet, which is formed by a multipole magnetic disk rotating along with the drive shaft of the motor, serves as a magnetic signal generator. The magnetic signal generated by the multipole magnet can be detected in a known manner by means of Hall sensors. Moreover, with the use of the magnetic or even the conductive or capacitive principle, sprocket-wheel disks can be used to generate a signal representing the rotation of the drive shaft. And finally, a signal generator provided with slits, each permeable by an optical signal when one of the slits is located between a light source and a receiver associated with the light source, may be provided to generate optical signals which represent a rotational movement of the motor.

The signal generator can also be a component of the electromechanical system of the drive motor of the adjustment device, for example, with the use of the collector of a commutator motor, of the coil system of a commutator-less motor, or of the piezoelement of a piezomotor motor as the signal generator.

Moreover, the motor current itself may serve as the signal generator if this contains data necessary for the determination of the speed, as, for example, with commutator motors.

BRIEF DESCRIPTION OF THE DRAWINGS

Other advantages of the invention shall become clear with the following description of exemplary embodiments with reference to the figures. They depict.

DETAILED DESCRIPTION

Figure 1:
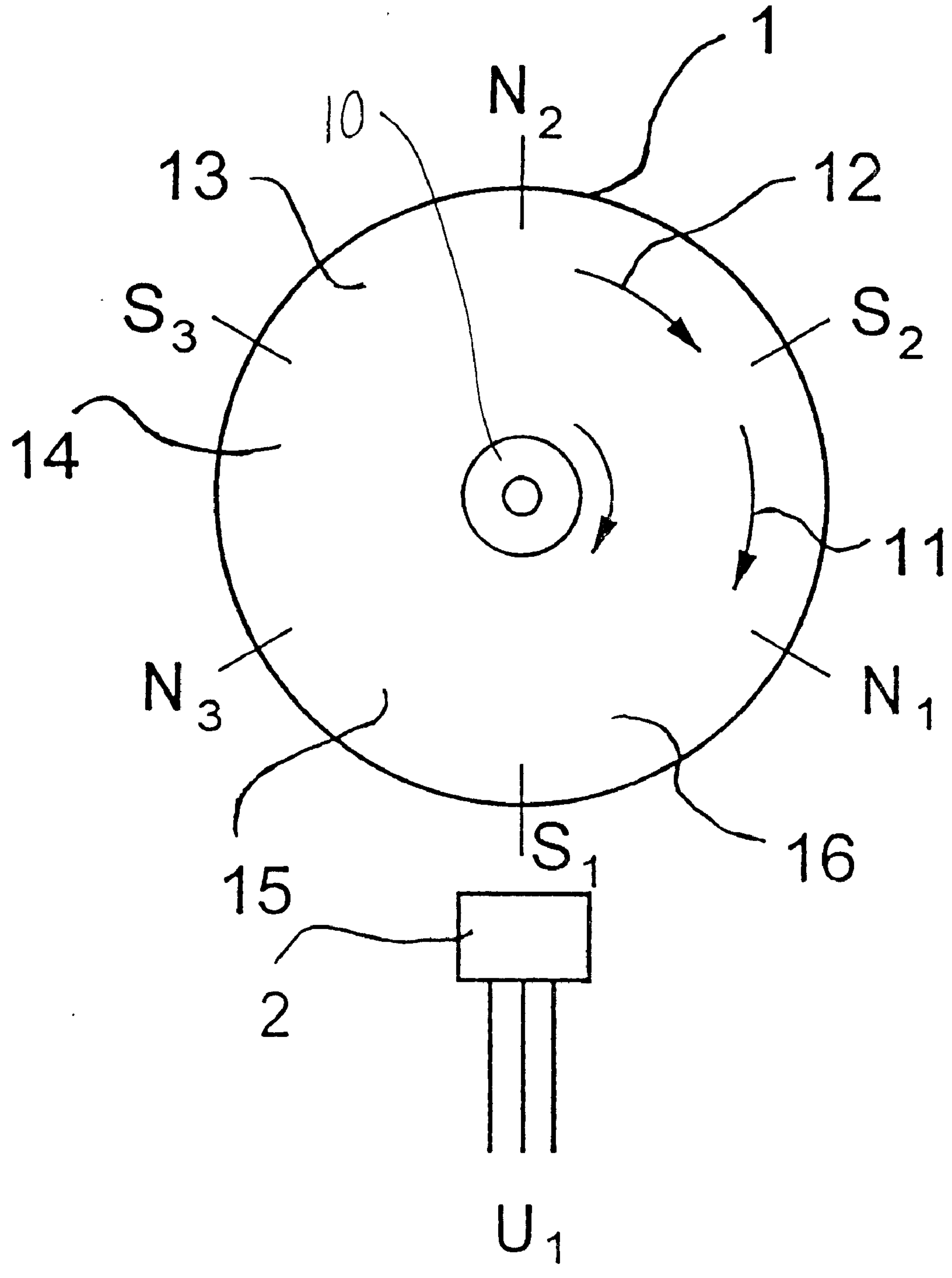
FIG. 1 illustrates a signal generator and an associated detector for execution of the process according to the invention.

FIG. 1 depicts a signal generator 1 in the form of a multipole, circular magnetic disk, which is disposed on the drive shaft 10 of the rotating drive of an adjustment device in the motor vehicle and which has a total of six adjacent partitions 11 through 16 in the form of circular segments, whereby a magnetic north pole $N_1$, $N_2$, $N_3$ or a magnetic south pole $S_1$, $S_2$, $S_3$ is allocated to each circular segment 11 through 16. A Hall sensor 2 is disposed opposite this signal generator 1 as a detector. The Hall sensor, in a known manner based on the magnetic signal produced by the signal generator 1, generates an output signal $U_1$ representing the rotational movement of the drive shaft 10. The output signal $U_1$ is fed to an electronic unit (not shown in FIG. 1) of the adjustment device for evaluation. By means of the electronic unit, the position, the speed, and the acceleration of the drive shaft 10 can be determined in a known manner.

Figure 5:
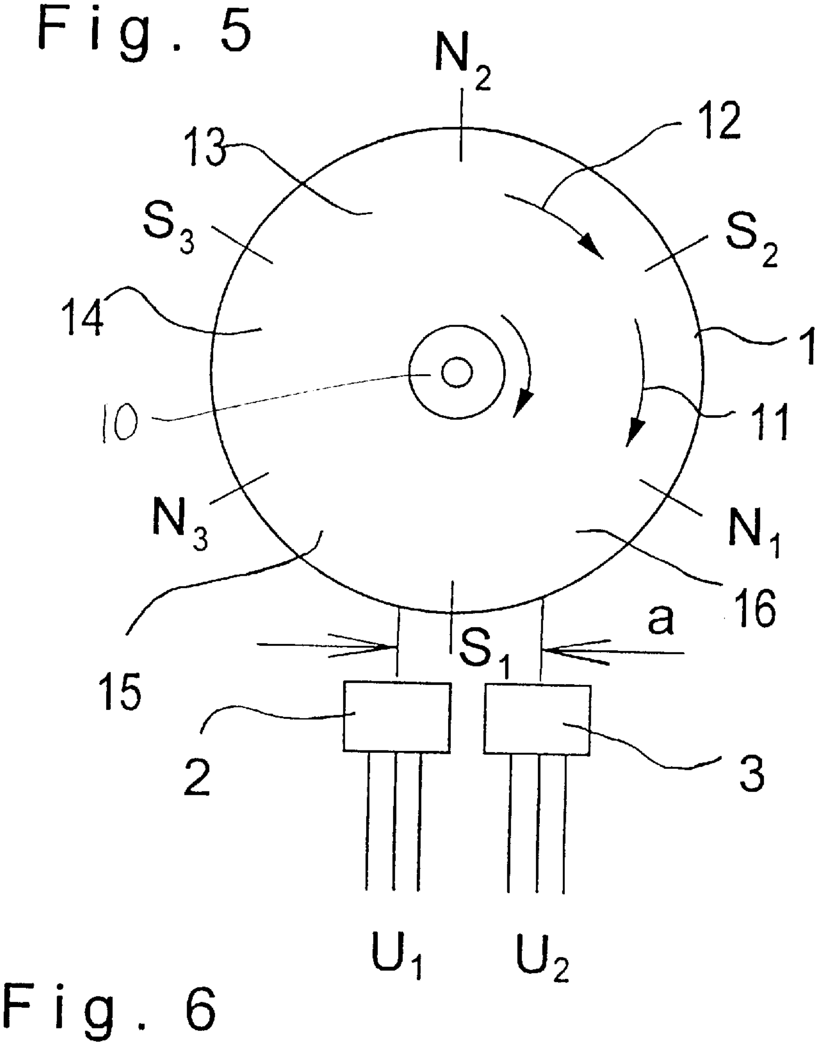
FIG. 5 illustrates a second embodiment of the signal generator and an associated detector for execution of the process according to the invention.

A second Hall sensor 3 is disposed according to FIG. 5 as a component of the detector near the first Hall sensor 2 and produces a second output signal $U_2$. From the second Hall sensor 3, it is possible to also determine the direction of rotation of the drive shaft 10 in a simple manner. Processes for determination of the direction rotation using only one sensor are also known.

Such signal generator and associated sensors for determination of the position, speed, direction of rotation, as well as the acceleration of a drive motor are known and, consequently, need not be described in greater detail.

With such a device, inaccuracies may occur in the determination of the speed, acceleration, etc. For one thing, the dimension of the individual circular segments 11 through 16 along the periphery of the signal generator 1 (angular dimension) is subject to manufacturing-associated fluctuations, i.e., the actual angular dimension of the individual circular segments deviates from the ideal (theoretical) angular dimension. Also, with digitization of the signal which is produced at the transitions between the individual north and south poles, additional inaccuracies may occur; specifically, north to south transitions as a rule have a somewhat different characteristic than the south to north transitions. There are also possible other measurement errors which must be attributed to tolerances (inaccuracies) of the Hall sensors 2 or 3, such as tolerances (inaccuracies) of the hysteresis of the switching thresholds of Hall sensors.

The tolerance-associated characteristics of the partitions 11 through 16 of the signal generator 1, as well as of the transitions between the individual partitions 11 through 16 (and possibly of the detector 2 or 3), are preferably determined after each start of the drive of the seat adjustment device. Based on them, a correction value is determined for each partition 11 through 16 of the signal generator 1 and linked with the output signals $U_1$, $U_2$ of the Hall sensors 2 or 3. These correction values are assigned to the partitions 11 through 16 and stored accordingly. Upon further operation of the drive or motor, with each measurement of the speed by means of the signal generator 1 and the Hall sensors 2, 3, the respective measured value is linked with the associated stored correction value, whereby the tolerance-associated measurement errors are significantly reduced.

A test movement of the signal generator to determine the tolerance-associated characteristics of the signal generator partitions within the framework of electronic error correction can, in the case of a rotating drive which is connected according to FIG. 1 with a circular disk-shaped signal generator 1, consist of one or a plurality of rotations of the drive and of the signal generator 1 for detection of the individual sectors or circular segments 11 through 16. With a longitudinally adjustable signal generator, the test movement can consist of traveling a straight line or a predefined curved path for detection of the individual subdivisions of the path or the like.

Preferably, the test movement consists of a predefined movement section of the signal generator with substantially constant acceleration and/or constant speed. Based on these defined drive conditions, for example, by detection of the period of time between successive signals, their relationship to a movement period, for example, one rotation, and thus their share of the period can be determined, from which a concrete value, for example, an angle of the individual partitions, can be determined.

The tolerance-associated characteristics of the signal generator partitions 11 through 16 according to FIG. 1 are preferably determined after each start of the drive. However, if it is guaranteed that the system is immanent (i.e., with the assurance of a permanent unique association between the signal generator partitions and sensor signals), the tolerance-associated characteristics of the signal generator partitions 11 through 16 may be detected once and stored and permanent error correction thus guaranteed.

Alternatively to this, the tolerance-associated characteristics of the signal generator partitions 11 through 16 can be adaptively adjusted in predefined test cycles, i.e., after an initial determination of the tolerance-associated characteristics of the signal generator partitions 11 through 16, after a predefined number of operational cycles, a test cycle is provided, whose correction values replace the original correction values or compensate them, for example, by averaging.

The electronic error correction provides, in particular, that a correction value is determined for each signal generator partition 11 through 16 and linked with the sensor signals $U_1$. For this, a correction value for each individual partition or each individual sector 11 through 16 of the signal generator is determined in a measurement cycle and stored associated with this partition 11 through 16. Upon operation of the drive or motor, with each measurement of the speed with a signal generator partition 11 through 16, the measured value is linked with the stored correction value, i.e., for example, multiplied, added, divided, or subtracted. Thus, the measurement error associated with the individual signal generator partition 11 through 16 is greatly reduced. The accuracy of the measurement value then depends only on the processing range of the numbers in the calculation process to determine the speed or the acceleration.

With circular disk-shaped, rotating signal generators 1 with partitions 11 through 16 in the form of circular segments, corrected angles of rotation of the partitions 11 through 16 can be determined directly in a simple manner. The angles correspond to the actual dimension of the individual signal generator partitions 11 through 16 on the annular magnet.

For the actual, corrected angular dimension $\alpha_i$ of the i-th partition of a signal generator (dimension of the corresponding partition along the periphery of the signal generator), the following applies with the assumption of a rotational movement with substantially constant acceleration:

$$\alpha_i=\Omega*dT_i+(\Omega'/2)*(dT_i)^2,$$

where $\Omega$ is the angular velocity of the rotational movement and $\Omega'$ is its derivative over time (angular acceleration). $dT_i$ represents the time interval necessary for one rotation of the signal generator by the angle, which corresponds to the actual angular dimension of the i-th signal generator partition under consideration. With the known acceleration of the drive (and thus known velocity at any time), it is possible to determine in real-time the actual (corrected) angular dimension $\alpha_i$ of the individual signal generator partitions, by measuring the corresponding time interval $dT_i$.

The practical implementation is explained in the following by way of example with reference to the determination of the angular dimension $\alpha_5$ of the fifth signal generator partition of a circular disk-shaped signal generator subdivided into eight adjacent partitions P1, P2, P3, P4, P5, P6, P7, P8 in the form of circular segments (whereby the eighth partition P8 is again adjacent to the first partition P1). For this, under the assumption of constant acceleration of the drive, the following applies:

$$\Omega'=(\Omega_{end}-\Omega_{anf})/dT_5,$$

where $$\Omega_{anf}=2*\pi/T_{anf},$$

$$\Omega_{end}=2*\pi/T_{end},$$

and where $T_{anf}$ and $T_{end}$ respectively represent the duration of a complete rotation of the signal generator beginning with the first signal generator partition and beginning with the second signal generator partition, which are offset relative to each other by the time interval $dT_1$. $T_{anf}$ represents the duration of a (first) complete rotation of the signal generator, whereby in succession the first, then the second, third, fourth, fifth, sixth, seventh, and finally the eighth signal generator partition pass the associated sensors, i.e. in the order P1, P2, P3, P4, P5, P6, P7, P8. $T_{end}$ represents the duration of a complete rotation of the signal generator, which is shifted by the time interval $dT_1$ relative to the first rotation mentioned, such that first, the second, then the third, fourth, fifth, sixth, seventh, eighth, and finally the first signal generator partition pass the associated sensor, i.e. in the order P2, P3, P4, P5, P6, P7, P8, P1.

In other words $$T_{anf}=\Sigma 1^8 dT_i,$$

and $$T_{end}=\Sigma 2^9 dT_i=T_{anf}-dT_1+dT_9,$$

where $dT_9$ represents the time interval, during which the first signal generator partition P1 passes the associated sensor immediately after a (first) complete rotation of the signal generator. In other words, $T_{end}$ can be determined from $T_{anf}$, by subtracting the quantity $dT_1$ from $T_{anf}$ (which represents the duration of the period of the aforementioned first complete rotation of the signal generator), which quantity comes from the first partition P1 of the signal generator during this first rotation. Instead of this, the time interval $dT_9$, during which the first partition P1 passes the signal generator in the immediately following (second) rotation, is added.

The expression "first complete rotation" of the signal generator should not imply that it is the first rotation at all (after initial operation of the drive). It is only a matter of producing a sequence of individual successive rotations in which a specific rotation is called the first complete rotation; additional rotations are then designated as the second rotation, third rotation, etc.

The actual angular dimension $\alpha_5$ of the fifth signal generator partition is as follows:

$$\alpha_5=\Omega_{anf}*dT_5+(\Omega_{end}-\Omega_{anf})/(2*dT_5)*(dT_5)^2,$$

and after the addition:

$$\alpha_5=0.5*(\Omega_{end}+\Omega_{anf})*dT_5.$$

These formulas may be used to determine the angular dimension $\alpha_i$ of all partitions of the signal generator, by numbering in each case the eight partitions (circular segments) disposed adjacent each other on a circular disk. Above, the precise partition to be investigated is the fifth partition.

Thus, the corrected (actual) angular dimension $\alpha_i$ of any partition of the signal generator can be determined in that first, during a (first) rotation of the signal generator, the time intervals during which individual partitions pass the associated sensor are determined and $T_{anf}$ is determined therefrom. Then, the time interval during which the first partition of signal generator passes the sensor during the immediately following (second) rotation is also measured. From this, using $T_{anf}$ with the above equations, $T_{end}$ can be calculated. $T_{anf}$ and $T_{end}$ finally yield the corrected (actual) angular dimension of the corresponding partition of the signal generator.

It should also be noted that with the above formulas, no true correction values which must still be linked with the ideal (theoretical) angular dimension of the individual signal generator partitions are determined to obtain their actual angular dimension. Instead, the actual, corrected values for the angular dimension of the signal generator partitions are determined directly. From this, an additive or multiplicative correction value may, however, be determined, for example, in that the difference or the quotient of the actual angular dimension and the ideal (theoretical) angular dimension are established.

The cut off criterion to terminate the determination of tolerance-associated characteristics of the signal generator partition is then met when the correction values or corrected signal generator partitions fall within a predefined tolerance range in at least two consecutive cycles and/or the sum of the correction values or corrected partitions is equal to the value of one period of the signal generator within one cycle (with the exception of tolerable deviations).

In the first case design, at least two consecutive cycles, i.e., complete rotations of the drive shaft, are necessary to be able to undertake a comparison of the correction values and to establish whether possible deviations of the correction values for the individual partitions or sectors fall within a predefined tolerance range. If this is not the case, additional test cycles are necessary.

In the second case design, only one test cycle, i.e., one rotation of the drive shaft (with the exception of possible necessity after completion of this rotation of having to measure additional time intervals to determine the angular dimension of individual partitions), is necessary if the sum of the corrected or normed sensor signals corresponds, for example, to an angle of 360° for one complete rotation of the circular disk-shaped signal generator. Of course, other control processes are possible, for example, such that the sum of all correction factors corresponds to a predefined value. To be sure, only one rotation of the drive shaft is necessary for this cutoff criterion; however, in the event of uneven acceleration of the drive resultant measurement errors appear. For this reason, this criterion is only used in sections of uniform movement, which can be determined empirically.

Another variant for the determination of the cutoff criterion for the correction process consists in establishing a floating average or in a linkage of the two variants previously presented, i.e., in each test cycle the sum of the correction values or corrected signal generator partitions within one cycle must be the same as the value of one period of the signal generator and the correction values for corrected signal generator partitions of consecutive cycles must fall within a predefined tolerance range.

After determination that the cutoff criterion has been met, the algorithm calculates the precise speed values for the corresponding signal generator partitions using the correction values, i.e., in the case of a circular disk-shaped signal generator, the precise speed values for the individual sectors.

Figures 2, 3, 4:
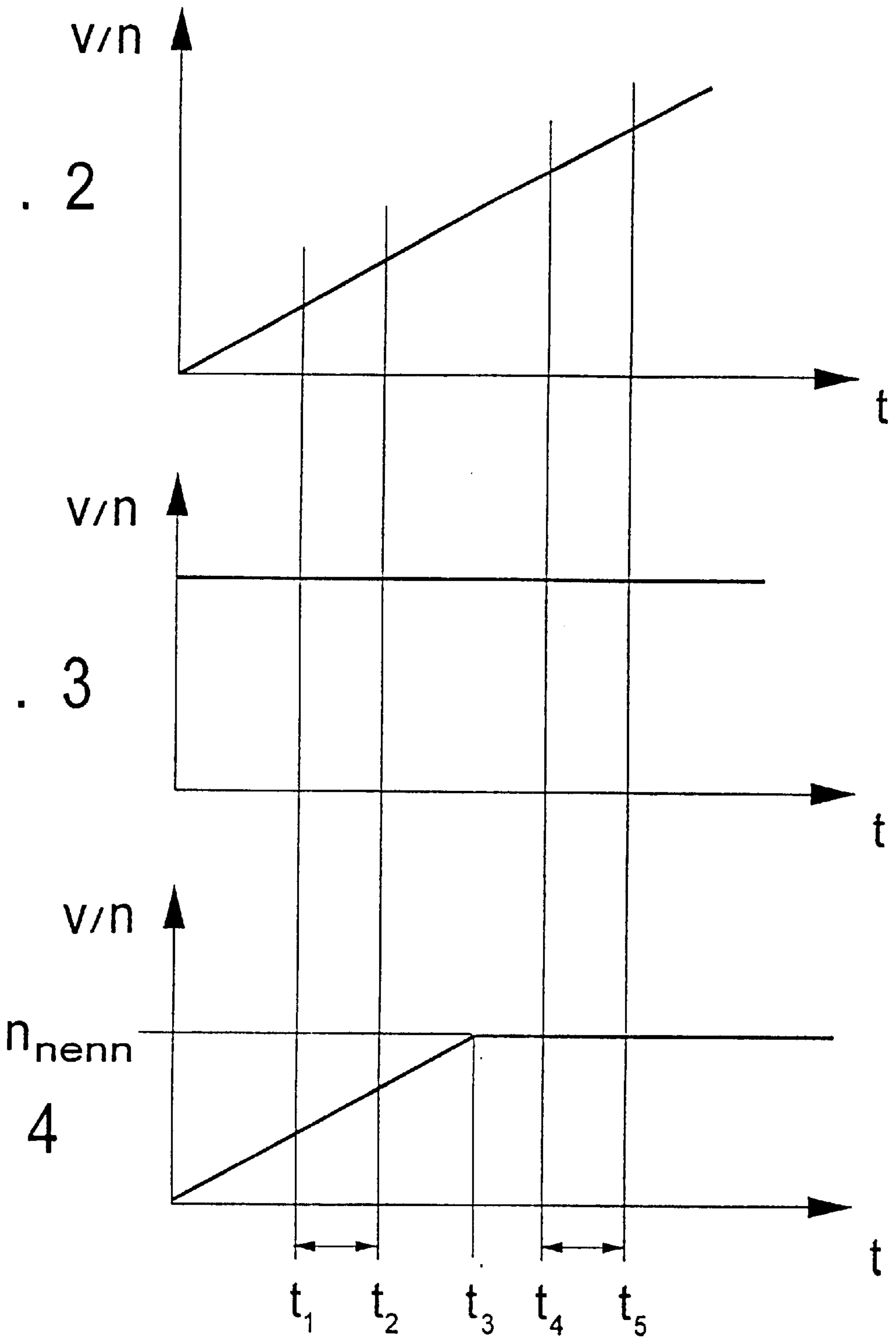
FIGS. 2 to 4 illustrate various characteristic lines of motor driven adjustment devices of motor vehicles, with the help of which the tolerance-associated characteristics of the partitions of a signal generator according to FIG. 1 can be determined.

FIGS. 2 through 4 present various possibilities for determination of the tolerance associated characteristics of the signal generator partitions, as well as the subsequent compensation with the sensor signals with reference to characteristic lines of a motor driven adjustment device in motor vehicles, as velocity or speed versus a time t. These graphics should illustrate that the test movement may, in particular, be a part or a component of the operational cycle of a motor driven adjustment device, more particularly, when the test movement is performed after each start of the drive to determine the tolerance-associated characteristics of the signal generator partitions.

FIG. 2 depicts in a speed-time diagram the temporal course of a constantly accelerated adjustment device in which the determination of the tolerance-associated characteristics of the signal generator partitions takes place during the time interval between $t_1$ and $t_2$, while in a subsequent time interval, $t_4$ through $t_5$, of the same operation of the adjustment device or its drive, a compensation with the sensor output signals is performed.

FIG. 3 depicts in the speed-time diagram the temporal course of a motor driven adjustment device moving at a constant speed in which the tolerance-associated characteristics of the signal generator partitions occurs in the time interval between $t_1$ and $t_2$, while a corresponding compensation is undertaken during the time interval between $t_4$ and $t_5$.

FIG. 4 is a temporal graphic of the speed of a motor driven adjustment device, which is accelerated up to the time $t_3$ with constant acceleration until it reaches a rated speed $n_{nenn}$ or a rated velocity and then is further moved at a constant velocity or a constant rate of speed. In this embodiment, the determination of the tolerance-associated characteristics of the signal generator partitions in the time interval between $t_1$ and $t_2$ during run-up, i.e., constant acceleration of the motor driven adjustment device, while the compensation takes place during the time interval between $t_4$ and $t_5$ after reaching the rated speed.

A switching technology variant of the process according to the invention requires, according to FIG. 5, two sensors 2, 3 spaced relative to each other along the path of movement of the signal generator. The sensors 2, 3 are associated with the six-pole signal generator 1. Because of manufacturing-related inaccuracies, the six sectors of the six-pole magnet are not the same size and possibly not magnetized with the same strength, such that with a rotation of the magnetic disk 1 at a constant speed or a constant acceleration, the Hall sensors 2, 3 detect different measurement times for the individual sectors. To remedy this problem, the rising and/or falling flanks of the sensor signals $U_1$, $U_2$ of the two sensors 2, 3, triggered by the partitioning of the signal generator 1, are detected and the time difference between sensor signals $U_1$, $U_2$ associated with signals of the same partition of the signal generator 1 is determined and evaluated for determination of the tolerance-associated characteristics of the signal generator partitions 11 through 16.

Thus, the speed of the signal generator 1 is determined, in that the time interval, in which a specific point of the signal generator 1, i.e., one N-S transition or one S-N transition after another, passes the two sensors 2, 3, is measured. By dividing the angular distance between the two sensors 2, 3 (i.e., the distance between the two sensors 2, 3 along the periphery of the signal generator 1) by the time thus measured, the speed of the signal generator and thus of the drive is obtained.

The detection of the time difference between the rising or falling flanks of the two sensor output signals eliminates different lengths of signal generator partitions or different angular sections of the signal generator sectors and thus eliminates manufacturing inaccuracies of the signal generator.

In principle, the distance a between the two sensors along the path of movement of the signal generator 1 can be arbitrary. For example, with a circular disk-shaped signal generator the distance a may include an angle of 90° between the sensors 2, 3 but with a distance which is greater than the dimension of the smallest partition or a multiple thereof, speed or acceleration changes of the signal generator 1 are more significant such that the limits of measurement accuracy are lower. For this reason, the sensors 2, 3 are disposed at a distance a from each other which is preferably less than or equal to the smallest partition of the signal generator 1, for a current speed determination from the individual signal generator partitions, instead of averaging.

Figure 6:
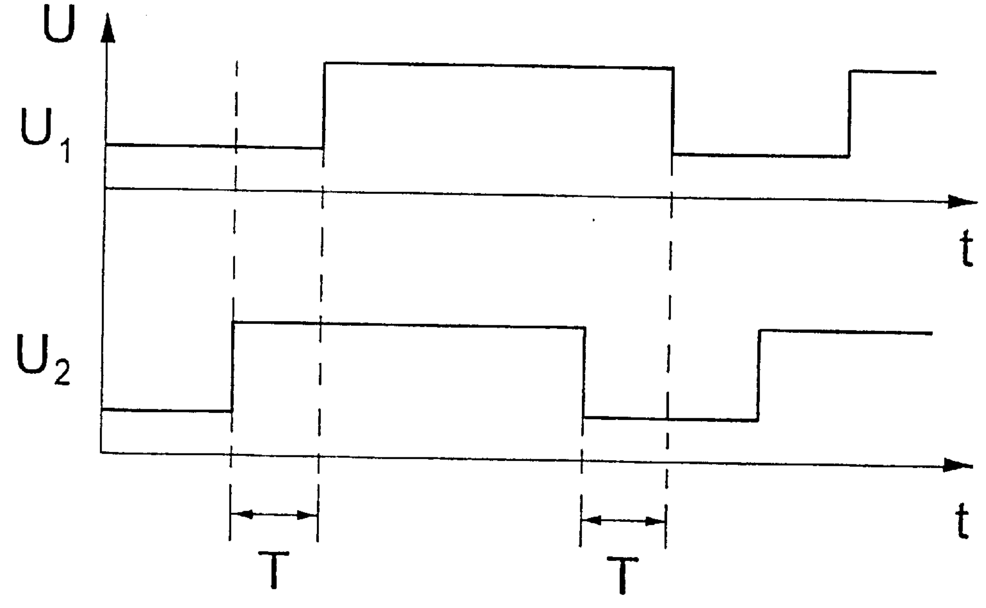
FIG. 6 illustrates a depiction of the output signals of the detector from FIG. 5.

FIG. 6 depicts the sensor output signals of the exemplary embodiment of FIG. 5 and illustrates the different length time intervals between the rising and falling flanks of the signals triggered, for example, by the unequal sectors 11 and 12 of the magnetic disk 1. If the time difference T between the rising or falling flanks of the sensor output signals of the two Hall sensors 1, 2 is determined, the different pulse lengths caused by unequal lengths of the individual sectors are eliminated in the detection of the individual sectors.

If the distance a between the two Hall sensors 2, 3 disposed offset from each other along the periphery of the magnetic disk 1 is smaller than the smallest sector of the magnetic disk, this yields the greatest measurement accuracy, since possible speed or acceleration changes within this time interval are insignificant. With larger distances between the two Hall sensors, averaging and thus an increase in measurement accuracy occurs in the event of speed or acceleration changes.

Figure 7:
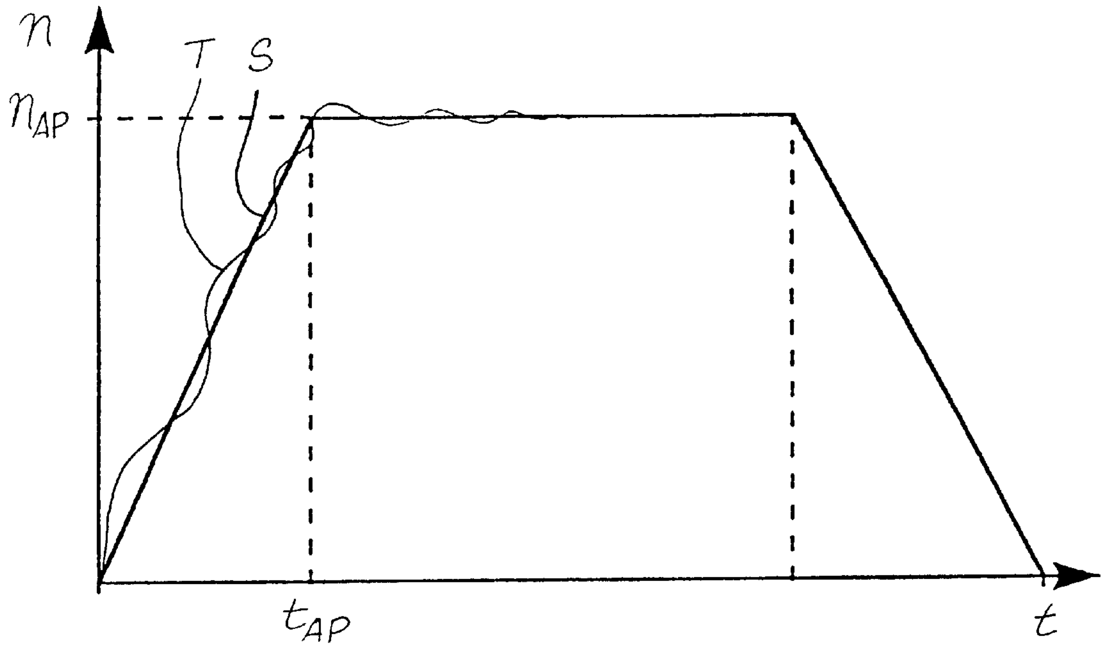
FIG. 7 illustrates a graphic representation of the time-dependency of the speed of the drive motor during the operation of a seat adjustment device.

Now, referring to FIGS. 1 or 5 (which differ only with regard to the number of sensors associated with the signal generator) in connection with FIG. 7, the control of a motor driven adjustment device, provided according to a second aspect of the invention immediately after the motor is turned on and under consideration of the simultaneous determination of correction values, is explained.

With regard to the determination of the correction values, it is again mentioned here that the correction values are preferably determined recursively. The cutoff criterion for termination of the determination of correction values is met if the correction values in at least two consecutive cycles are within a predefined tolerance range and/or the sum of the corrected partitions of the signal generator 1 during one cycle are within a predefined tolerance range by the value of one period of the signal generator (i.e., the sum of the angular dimensions of the individual segments of the magnetic disk equals 360°, with admissible deviations).

By this summarizing depiction of the process described in detail above for determination of the correction values, it becomes, in particular, clear that intermediate results are constantly established here by means of which constant checking as to whether the cutoff criterion with regard to the determination of the correction values is met. The special feature of the present process for control of adjustment device for motor vehicles, and, in particular a seat adjustment device consists in that these intermediate results are already used in the control of the drive of the adjustment device.

FIG. 7 plots the speed n of the drive motor of a seat adjustment device against the time t. Also, in this diagram, $n_{AP}$ indicates the ideal speed of the motor at its operating point and in $t_{AP}$ is the point in time by which the motor should have run up to its ideal speed.

The line referenced with S in the diagram according to FIG. 7 indicates the ideal speed of the motor in a defined movement of the seat adjustment device at each time t.

Accordingly, in a first time interval (up to the time $t_{AP}$) the motor should be run up at a constant acceleration (on a “ramp”) up to the ideal speed at the operating point. Then, the actual adjustment movement should be carried out at a constant speed. Then, the motor is run down again at a constant negative gradient, i.e., along a declining ramp.

The object is now to control the actual speed represented in the diagram according to FIG. 7 by the line referenced with T such that the deviations of the actual speed from the ideal speed are as small as possible.

For this, provision is made according to the invention that, on the one hand, after activation, the motor tolerance-associated characteristic values of the signal generator are determined and correction values are determined from the characteristic values. The correction values are taken into account in the evaluation of the output signals and are adapted at least until a predefined cutoff criterion has been met. On the other hand, intermediate results of these correction values are already used during the determination and adaptation of the correction values to specify control parameters of the control algorithm. Based on the last measure, the control of the speed can already begin before the correction values have been adequately accurately determined. In particular, control of the speed along the rising ramp can take place already when the motor is started (as soon as the first intermediate results have been determined). Here, preferably comparatively “soft” control parameters, which permit large fluctuations of speed around the ideal value, are used here. After reaching the operating point of the motor and after meeting the cutoff criterion, correspondingly “harder” control parameters are then used to control the speed such that the speed may then deviate only slightly from the ideal speed.

In addition, provision can be made immediately after the starting of the drive that the determination of the speed takes place by means of the signal generator and the associated detectors, as well as by means of the electronic unit program with the control algorithm by floating averaging out the plurality of signals representing the speed of the drive motor. This increases the accuracy in the determination of the speed, but at the cost of real-time content of the speed information. As soon as the correction values have been determined with adequate accuracy, the averaging may, consequently, be discontinued.

It should also the mentioned that the correction values of the control parameters determined according to this process may also be taken into account during the run down of the motor at the end of the adjustment movement.

With regard to additional details and possible variants in the control of the drive, reference is made to the associated statements in the introduction to the description. These can be easily transferred to the exemplary embodiments depicted in FIGS. 1, 5, and 7.

What is claimed is:

1. A method for the control of motor driven adjustment devices in motor vehicles, the method comprising:

generating a signal representing the speed of a motor by a partitioned signal generator coupled with the motor;

detecting the signal representing the speed of the motor by a detector associated with the partitioned signal generator;

generating an output signal corresponding to the signal representing the speed of the motor;

evaluating the output signal by a control unit; and adjusting the speed of the motor as a function of the output signal, wherein evaluating the output signal includes taking into account tolerance-associated characteristics of the signal generator partitions.

2. The method according to claim 1 further comprising determining the tolerance-associated characteristics of the signal generator partitions in a test movement of the signal generator.

3. The method according to claim 2 wherein the test movement consists of a predefined movement section of the signal generator with at least one of substantially constant acceleration and constant speed.

4. The method according to claim 3 wherein the test movement is part of a run of an adjustment device.

5. The method according to claim 4 further comprising undertaking an adjustment of the output signal in the same run as at least one of the adjustment device and the adjustment device drive, after determining the tolerance-associated characteristics of the signal generator partitions in the test movement of the signal generator.

6. The method according to claim 4 wherein the run of the adjustment device is a run up of an adjustment device drive to a rated speed.

7. The method according to claim 6 further comprising undertaking an adjustment of the output signal in the same run as at least one of the adjustment device and the adjustment device drive, after determining the tolerance-associated characteristics of the signal generator partitions in the test movement of the signal generator.

8. The method according to claim 1 further comprising determining the tolerance-associated characteristics of the signal generator partitions after each start of the drive.

9. The method according to claim 1 further comprising determining the tolerance-associated characteristics of the signal generator partitions once and storing the characteristics.

10. The method according to claim 9 further comprising adaptively adjusting the tolerance-associated characteristics of the signal generator partitions during predefined test cycles.

11. The method according to claim 1 further comprising determining individual correction values by measuring the sum of the times of the individual signal generator partitions during a test cycle; and determining the time of a first signal generator partition during an immediately following test cycle.

12. The method according to claim 11 further comprising terminating the determination of the tolerance-associated characteristics of the signal generator partitions when one of the correction values and the corrected signal generator partitions in at least two consecutive cycles are within a predefined tolerance range.

13. The method according to claim 11 or 12 further comprising terminating the determination of the tolerance-associated characteristics of the signal generator partitions when one of the sum of the correction values and the sum of the corrected signal generator partitions within one cycle is equal to a value of one period of the signal generator.

14. The method according to claim 1 wherein there are two detectors associated with the signal generator, the method further comprising:

measuring the time difference between at least one of rising and falling flanks of output signals of the two detectors, respectively in one test movement; and evaluating the time difference for determination of the tolerance-associated characteristics of the signal generator partitions.

15. The method according to claim 14 further comprising disposing the detectors along a path of movement of the signal generator at a constant distance from each other, wherein the distance is one of less than or equal to a smallest signal generator partition.

16. The method according to claim 1 further comprising determining a correction value for each signal generator partition and linking the correction value determined for each signal generator partition to the output signals.

17. A method for control of motor driven adjustment devices in motor vehicles comprising:

generating a signal representing a motor speed by a signal generator coupled with a motor;

detecting the signal representing the motor speed by a detector associated with the signal generator;

generating an output signal corresponding to the signal representing the motor speed by the detector;

providing a control unit with a control algorithm;

evaluating the output signal by the control unit;

adjusting the speed of the motor as a function of the output signal;

determining tolerance-associated values of the signal generator after activation of the motor;

specifying correction values from the tolerance-associated values, wherein evaluating the output signal includes taking into account the correction values;

adapting the correction values at least as long as a predefined cutoff criterion has not been met;

establishing intermediate results of the correction values while the correction values are specified and adapted; and using the intermediate results for a specification of control parameters of the control algorithm.

18. The method according to claim 17 wherein adapting the correction values is continued even after reaching an operating point of the motor, as long as the cutoff criterion has not been met.

19. The method according to claim 17 wherein adapting the correction values is continued after reaching an operating point of the motor.

20. The method according to one of claims 17 through 19 further comprising increasing an ideal motor speed with substantially constant acceleration after tripping of the motor.

21. The method according to one of claims 18 through 19 further comprising resetting the control parameters after reaching the operating point for the motor.

22. The method according to claim 21 wherein resetting the control parameters occurs when the operating point of the motor is reached and after terminating adapting the correction values.

23. The method according to claim 17 further comprising, after the tripping of the motor, calculating an average of a plurality of output signals representing the speed of the motor to determine an initial motor speed.

24. The method according to claim 23 wherein the initial motor speed is determined by floating averaging.

25. The method according to claim 17 wherein the signal generator is a partitioned signal generator having individual partitions; the method further comprising using the correction values for compensation of tolerance attributed to transitions between the individual partitions.

26. The method according to claim 25 further comprising:

determining a correction value for each individual partition of the partitioned signal generator; and linking the correction value for each individual partition to the output signals.

27. The method according to claim 26 further comprising:

rotating the partitioned signal generator during operation of the motor; and determining a corrected angle of rotation for each individual partition, wherein the corrected angle represents an actual dimension of the individual partition along a circumference of the signal generator.

28. The method according to claim 17 wherein the signal representing the motor speed is generated by the signal generator in accordance with one of a magnetic, inductive, capacitive, resistive, and optical principle.

29. The method according to claim 17 wherein the signal generator is designed as a multipole magnet.

30. The method according to claim 17 wherein the signal generator is designed as a multipole magnet, which rotates during operation of the motor.

31. The method according to claim 17 wherein the signal generator is a component of an electromechanical system of the motor.

32. A method for control of seat adjustment devices in motor vehicles comprising:

generating a signal representing a motor speed by a signal generator coupled with a motor;

detecting the signal representing the motor speed by a detector associated with the signal generator;

generating an output signal corresponding to the signal representing the motor speed by the detector;

providing a control unit with a control algorithm;

evaluating the output signal by the control unit;

adjusting the speed of the motor as a function of the output signal;

determining tolerance-associated values of the signal generator after activation of the motor;

specifying correction values from the tolerance-associated values, wherein evaluating the output signal includes taking into account the correction values;

adapting the correction values at least as long as a predefined cutoff criterion has not been met;

establishing intermediate results of the correction values while the correction values are specified and adapted; and using the intermediate results for a specification of control parameters of the control algorithm.

* * * * *